United States Patent
Klitzing et al.

(10) Patent No.: US 9,557,745 B2
(45) Date of Patent: Jan. 31, 2017

(54) THROTTLE DEVICE

(71) Applicant: Balcke-Dur GmbH, Ratingen (DE)

(72) Inventors: Birger Klitzing, Krefeld (DE); Thomas Telgen, Ratingen (DE); Bernhard Stockfisch, Meerbusch (DE); Florian Seffrin, Darmstadt (DE); Klaus Hoffmann, Neuss (DE)

(73) Assignee: BALCKE-DURR GMBH, Ratingen (DE)

( * ) Notice: Subject to any disclaimer, the term of this patent is extended or adjusted under 35 U.S.C. 154(b) by 141 days.

(21) Appl. No.: 13/852,420

(22) Filed: Mar. 28, 2013

(65) Prior Publication Data

US 2013/0256573 A1    Oct. 3, 2013

(30) Foreign Application Priority Data

Mar. 30, 2012 (DE) .................. 10 2012 006 624

(51) Int. Cl.
| | |
|---|---|
| *F15D 1/02* | (2006.01) |
| *G05D 7/06* | (2006.01) |
| *F22B 37/22* | (2006.01) |
| *F22B 37/74* | (2006.01) |
| *F22D 7/12* | (2006.01) |

(52) U.S. Cl.
CPC ........... *G05D 7/0652* (2013.01); *F22B 37/228* (2013.01); *F22B 37/74* (2013.01); *F22D 7/12* (2013.01); *G05D 7/0664* (2013.01); *Y10T 137/87877* (2015.04)

(58) Field of Classification Search
USPC .................................................. 138/43, 46
See application file for complete search history.

(56) References Cited

U.S. PATENT DOCUMENTS

| | | | |
|---|---|---|---|
| 1,802,897 A | * | 4/1931 | Holden et al. ................ 251/210 |
| 3,204,612 A | | 9/1965 | Benson |

(Continued)

FOREIGN PATENT DOCUMENTS

| | | |
|---|---|---|
| DE | 1150687 B | 6/1963 |
| DE | 102010040208 A1 | 3/2012 |

(Continued)

OTHER PUBLICATIONS

European Search Report mailed Nov. 6, 2013 issued in the European Patent Application No. 13001200.8.

*Primary Examiner* — James Hook
(74) *Attorney, Agent, or Firm* — Baker & Hostetler LLP (57) ABSTRACT

A throttle device for varying the pressure of a fluid in a plurality of parallel outlets includes a fluid collector having at least an internal chamber, an inlet and a plurality of outlets for the fluid, and a control element displaceably mounted in the internal chamber of the fluid collector and comprises a plurality of orifices, the cross-section of which can be varied by a relative movement of the control element in relation to the fluid collector. The control element is a sleeve, wherein the orifices are disposed in the sleeve such that they correspond to the outlets of the fluid collector, wherein between the sleeve and the fluid collector seals are provided, such that in a region between of an outside surface of the sleeve and an inside surface surrounding the internal chamber of the fluid collector no fluid communication takes place between the orifices of the sleeve.

18 Claims, 7 Drawing Sheets

(56) References Cited

U.S. PATENT DOCUMENTS

| | | | | |
|---|---|---|---|---|
| 3,821,968 A * | 7/1974 | Barb | ............................ | 137/625.3 |
| 3,899,001 A * | 8/1975 | Orme | ........................... | 137/625.3 |
| 4,024,891 A * | 5/1977 | Engel et al. | ................ | 137/625.3 |
| 4,027,407 A * | 6/1977 | Kiss | ................................. | 37/321 |
| 4,106,525 A * | 8/1978 | Currie et al. | ................... | 138/43 |
| 4,109,683 A * | 8/1978 | Strache | ....................... | 137/625.3 |
| 4,249,574 A * | 2/1981 | Schnall | ..................... | F15C 1/02 |
| | | | | 137/625.3 |
| 4,384,592 A * | 5/1983 | Ng | ............................ | F16K 3/34 |
| | | | | 137/625.3 |
| 4,473,210 A * | 9/1984 | Brighton | ............... | F16K 47/045 |
| | | | | 137/625.3 |
| 4,569,370 A * | 2/1986 | Witt | ............................ | 137/625.3 |
| 4,921,014 A * | 5/1990 | Tartaglia | ................. | F16K 47/08 |
| | | | | 137/494 |
| 7,320,340 B2 * | 1/2008 | Bush et al. | ...................... | 138/42 |
| 7,575,058 B2 * | 8/2009 | Franco et al. | ............. | 166/334.4 |
| 8,490,651 B2 * | 7/2013 | Cheng et al. | .............. | 137/625.3 |
| 8,978,706 B2 * | 3/2015 | Fitzgerald | ................ | F16K 47/08 |
| | | | | 138/43 |

FOREIGN PATENT DOCUMENTS

| | | | |
|---|---|---|---|
| FR | 1352958 A | 2/1964 | |
| FR | 1549058 A | 12/1968 | |

\* cited by examiner

THROTTLE DEVICE

CROSS-REFERENCE TO RELATED APPLICATIONS

This application claims priority to foreign German patent application No. DE 10 2012 006 624.4, filed on Mar. 30, 2012, the disclosure of which is hereby incorporated by reference in its entirety.

BACKGROUND OF THE INVENTION

The invention relates to a throttle device for varying the pressure of a fluid in a plurality of parallel outlets. More particularly, the invention relates to a throttle device or a variable throttle comprising a fluid collector comprising an inlet for the fluid and a plurality of outlets for the fluid. Furthermore, the throttle device comprises a control element disposed so as to be movable, at least in part, in the internal chamber of the fluid collector. Furthermore, the control element comprises a plurality of orifices, and the orifices in the control element and the outlets on the fluid collector are configured and positioned such that the cross-section of a plurality of fluid communication routes between the internal chamber of the fluid collector and a plurality of outlets on the fluid collector can be varied by means of a relative movement of the control element in relation to the fluid collector.

Fluid collectors comprising such throttle devices are used in steam generators. They are suitable for steam generators comprising gravity circulation boilers or forced circulation boilers.

Throttle devices are known that are disposed in pipes of pipe registers in order to adjust the throughput volumes of a fluid flowing into the individual pipes under various flow conditions. However, one such throttle device must be provided for each pipe. Additional devices have been developed for controlling the throughput volumes in a plurality of pipes at one and the same time.

However, it must also be pointed out that undesirable instabilities and pressure losses can occur in such throttle devices comprising a plurality of supply lines. The device disclosed in DE 1 150 687 counteracts this problem and ensures that the inlet cross-sections of the pipe unions are unthrottled at normal loads and throttled during low-load operation.

The device disclosed in DE 1 150 687 comprises a fluid collector or a distributor container comprising an inlet for a working medium and parallel outlets disposed on the fluid collector in the form of connection unions or pipe nipples. Present in the fluid collector is a control bar or a filler element comprising inflow orifices assigned to the pipe unions. All of the inflow orifices can be opened or reduced in size as a function of the load with the aid of the control bar in the fluid collector. Since only one inflow orifice can be disposed on each side of the control bar, the device disclosed in DE 1 150 687 is able to throttle the throughput volume for each nozzle located in two parallel rows of connection unions at one and the same time individually, that is to say, without there being an unthrottled flow between the unions, and also to ensure a uniform throughput volume in the throttled state in this manner.

The device disclosed in DE 1 150 687 is therefore particularly suitable for the supply of throughput volumes to radiant heating surfaces in forced circulation boilers comprising only two parallel rows of pipes at any one time. However, if a greater number of parallel pipes is required, then a plurality of these devices must be arranged parallel to each other in order to achieve the desired depth and number of pipe rows.

The problem underlying the invention is therefore, when using known throttle devices, to control a plurality of throttle devices arranged parallel to each other in order to achieve a desired uniform throughput volume for a desired plurality of pipes.

SUMMARY OF THE INVENTION

Based on the problem described above, it is an object of the present invention to develop a throttle device of the type described at the outset such that it can set a pressure or a drop in pressure for a plurality of parallel pipe rows.

This object is achieved by a throttle device as defined in claim 1, in which the control element is a sleeve, and the orifices are disposed in the sleeve in such a way that they correspond to the outlets of the fluid collector, and the sleeve and the fluid collector are sealed from each other so that no fluid communication takes place between the orifices of the sleeve in a region between an external wall of the sleeve and an internal wall surrounding the internal chamber of the fluid collector.

The throttle device of the invention comprises a fluid collector comprising at least an internal chamber, an inlet, and a plurality of outlets for the fluid. Furthermore, the throttle device comprises a sleeve that is disposed so as to be movable, at least in part, in the internal chamber of the fluid collector and that comprises a plurality of orifices corresponding in terms of their number and arrangement in relation to the outlets of the fluid collector. The sleeve and the fluid collector are sealed off from each other so that no fluid communication can take place between the orifices of the sleeve in a region between an external wall of the sleeve and an internal wall surrounding the internal chamber of the fluid collector. The orifices in the sleeve and the outlets on the fluid collector are configured and positioned such that the cross-section of a plurality of fluid communication routes between the interior of the sleeve and a plurality of outlets on the fluid collector can be varied by means of a movement of the sleeve in relation to the fluid collector. It is possible, by means of the throttle device of the invention, to provide variable throttling, by means of which it is possible to simultaneously vary the pressure or a drop in pressure in the connected pipes or in the outlets.

The solution proposed by the invention offers a large number of advantages over throttle devices hitherto known. The sleeve in the throttle device of the invention comprises a two-dimensional surface, in which orifices can be disposed. Thus it is possible to provide orifices in a plurality of rows or other geometrical arrangements. The arrangement of the sleeve inside the fluid collector makes it possible for the outlets to be positioned on the fluid collector so as to correspond to the arrangement of the orifices on the sleeve. Since seals are disposed between the external wall of the sleeve and the internal wall of the fluid collector, which seals prevent the exchange of fluid between the orifices of the sleeve in the space between the external wall and the internal wall, each of the outlets is supplied individually with the throughput volume of an orifice. In its simplest variant, the seal can be formed by a plane contact between the sleeve and the internal wall of the fluid collector. Since the sleeve is movable relatively to the fluid collector, it is possible for a plurality of orifices in the sleeve to be moved at the same time relatively to the outlets by means of a relative movement of the sleeve. As a result of this movement, the cross-section of the fluid communication routes between the inlet and the respective outlets is varied. For example, when the orifice in the sleeve is precisely aligned with the outlet, there is a maximum cross-section, but when the fluid communication routes are closed, the external wall of the sleeve will block the outlet. Accordingly, the cross-sections of the fluid communication routes can be adjusted to all intermediate values by suitably positioning the sleeve.

On the whole, a throttle system or a variable throttle is provided, according to the invention, in which no additional drop in pressure will occur at high loads, and the steam generator will be capable of stable operation at low loads. The variable throttle can be switched according to its output. In this context, the throttle is switched when it is required, so that a drop in pressure will occur only when the steam generator operates at low loads or during the start-up phase. The throttle device of the invention can be operated on various working media or fluids, for example, liquid media such as oil or water and gaseous media such as steam. Preferably, use is made of water.

Advantageous developments of the invention are defined in the sub-claims.

According to one exemplary embodiment of the invention, provision can be made for the cross-section of the external wall of the sleeve and the internal wall of the fluid collector to be configured so as to be axially symmetrical. This makes it a simple matter to produce the sleeve and the fluid collector and, in particular, makes it possible to achieve a seal between the sleeve and the fluid collector in a very simple manner by virtue of the fact that the external wall of the sleeve makes plane contact with the concentric internal wall of the fluid collector.

Furthermore, this axially symmetrical shape makes it possible, in one possible embodiment, to execute a rotatory movement as the relative movement between the fluid collector and the sleeve, which rotatory motion can be configured and controlled very simply.

Furthermore, provision can be made for the throttle device to comprise a shaft that engages the sleeve such that the sleeve can be caused to rotate on account of rotation of the shaft. In this way, a control system, for example using a servomotor, can be achieved in a simple manner.

In one embodiment, it is also possible for the sleeve to be displaceable relatively to the fluid collector along a translation axis, in which case the relative movement is then a translatory motion along said translation axis. This has the advantage that drive systems can be implemented that are not capable of carrying out rotatory motion.

In one embodiment, the drive system can be a bellows that is adapted to engage the sleeve such that the sleeve can be caused to effect translatory motion by the application of pressure to the bellows. In many cases, a hydraulic drive is preferred for reasons of safety and it makes control possible without resorting to electrical circuitry.

In a further exemplary embodiment, provision may be made for the control element to be in the form of a piston, with which a pressure difference can be generated between the internal chamber of the control element and a portion of the fluid collector. In this respect, it is possible to use a drive system that acts on the basis of a pressure difference. The control element or the sleeve can be closed at one end so that a chamber encompassing a rear end wall is formed inside the control element. Said rear end wall separates the internal chamber of the control element from a portion of the fluid collector that does not enclose the control element or sleeve. In this way, two pressure chambers are formed, namely, a first pressure chamber inside the control element or the sleeve and a second pressure chamber in the rear region of the fluid collector. By controlling or regulating the pressure difference, for example, by applying pressure to the rear pressure chamber in the fluid collector, it is possible to move the control element or the sleeve, so that a piston stroke will produce the translatory motion. The fluid collector can be in the form of a cylinder in which a cylindrical control element can reciprocate as a function of the resultant pressure difference.

Furthermore, provision may be made in the throttle device for a magnet to be placed outside the fluid collector and for the sleeve to comprise a magnetic material, which magnet is configured and positioned such that the sleeve is capable of carrying out a translatory movement under the influence of magnetic forces, when the magnet executes translatory motion. This has the advantage that the fluid collector can be configured without any mechanical wall feedthroughs relating to the control element to be moved, so that permanent leak-tightness of the device can be guaranteed.

Another possible drive system can be achieved by the use of a spindle. The spindle can act as a shaft, and the spindle can be provided with a male screw thread. The external thread can cooperate with a female screw thread on the throttle device, for example, with a female screw thread on the control element or sleeve.

In the throttle device of the invention, provision can be made for the movement of the control element in relation to the fluid collector to be a translatory movement, a rotatory movement or a combination of translatory and rotatory movements. These possibilities depend, inter alia, on the geometrical designs of the fluid collector and the control element.

In a further embodiment, the seals of the throttle device can be formed by an internal wall of the fluid collector that is in plane contact with the external wall of the sleeve. In this embodiment, the sealing surfaces of the fluid collector and the sleeve can be produced very simply and with very high precision by lathe-machining, e.g. in an axially symmetrical form, or by milling the workpieces.

Provision can also be made for the seals to protrude from the external wall of the sleeve or the surface of the internal wall of the fluid collector and to be in plane contact with the corresponding opposite wall of the fluid collector or the sleeve. The frictional resistance to the relative movement is reduced on account of the reduced contact surface.

Provision can further be made for the orifices to extend along the sleeve in the direction of movement and whose width, as measured at right angles to the direction of movement, varies along the orifices such that the cross-section of a fluid communication route between the orifice and the corresponding outlet can be varied by moving the sleeve relatively to the fluid collector. This thus has the advantage that the total cross-section of a fluid communication route extending from the interior of the sleeve to the respective outlet can be varied according to a given characteristic curve as a function of the relative position between the sleeve and the fluid collector by configuring the width of the orifice, as measured at right angles to the direction of movement, so as to vary as a function of its position in the orifice in the direction of movement.

Furthermore, provision can be made for the orifices in the sleeve or the outlets on the fluid collector to be in the form of a plurality of sub-orifices. By the provision of different cross-sectional areas of the sub-orifices, it is possible, for example, to vary the total cross-section of a fluid communication route between the interior of the sleeve and the respective outlet in predetermined stages by moving the sleeve in such a way that in each case a complete sub-area of the orifice contributes to the fluid communication route. By providing a suitable shape of the orifices and of the lands between the sub-orifices, it is possible that tolerances in the movement of the sleeve or in the production of the orifices, particularly in the position of the orifices, will have no bearing on the throughput volumes of the individual outlets.

In one embodiment, it is also possible for the number of sub-orifices forming a fluid communication route between the interior of the sleeve and the outlets on the fluid collector to be varied by a relative movement between the sleeve and the fluid collector. In this context, it is of advantage that when any one orifice is blocked, for example, a minimum throughput volume through the other orifices will still be guaranteed. Furthermore, the shape, number, and arrangement of the sub-orifices make it possible to provide a steep characteristic curve of the throughput volume as a function of the relative movement.

On the whole, the invention provides a throttle device, in which there is disposed a sleeve capable of translatory or a rotatory motion or a combination of the two in a fluid collector, wherein the sleeve is provided with a hole pattern for each pipe union, which hole pattern is dependent on the specific loads. A common feature of all embodiments is that the cross-sectional area of the orifices in the sleeve varies along the direction of movement of the latter.

BRIEF DESCRIPTION OF THE DRAWINGS

The invention is explained below in more detail with reference to drawings. However, the invention is not restricted to these exemplary embodiments shown so that further combinations and applications are also possible. In the diagrammatical drawings.

DETAILED DESCRIPTION

In the drawings, like reference characters are used to denote like components.

Figure 1:
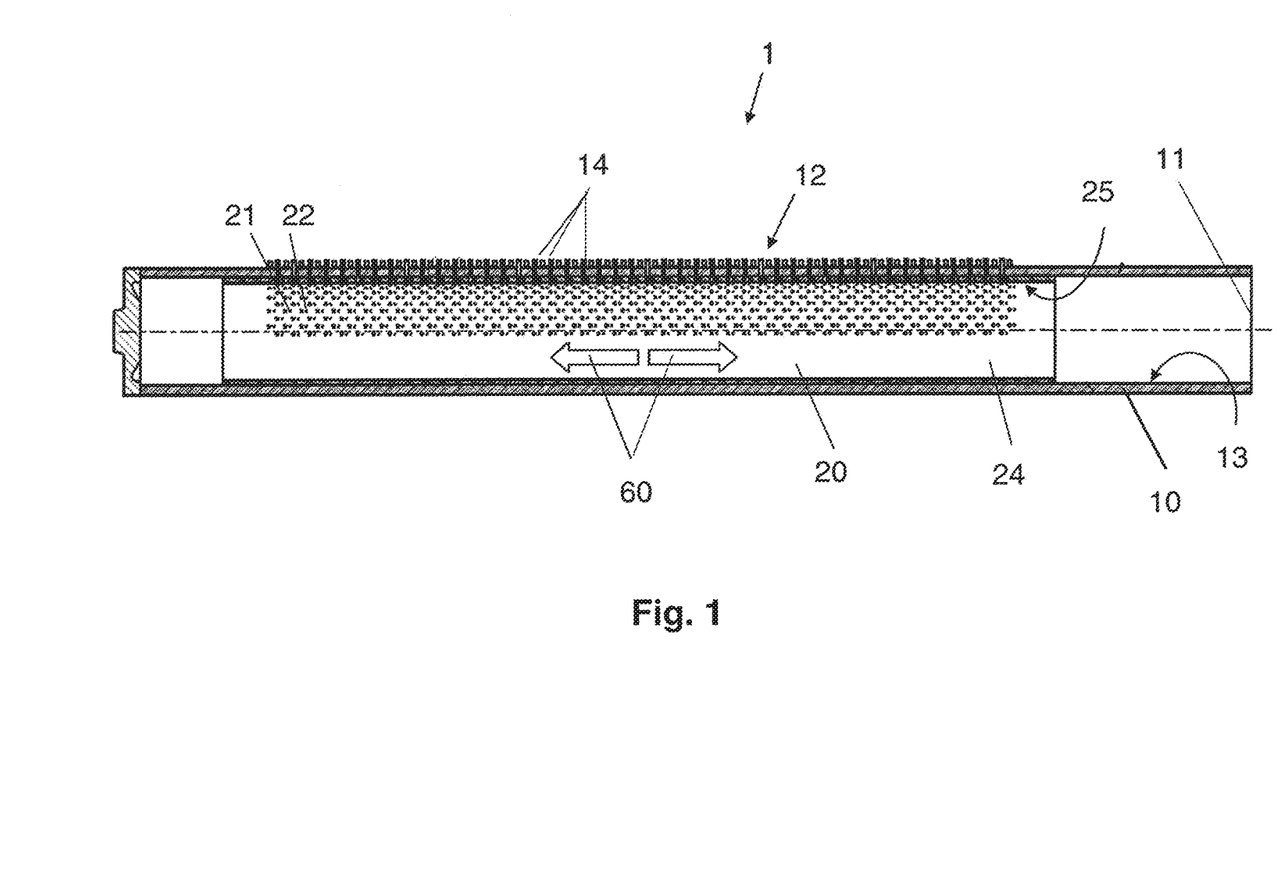
FIG. 1 is a longitudinal section of an exemplary embodiment of a throttle device.

FIG. 1 is a longitudinal section of an exemplary embodiment of a throttle device 1 of the invention. The throttle device 1 comprises a fluid collector 10 and a sleeve 20 disposed in the internal chamber of the fluid collector 10. The throttle device 1 further comprises an inlet 11 and a plurality of outlets 12 in an external wall of the fluid collector 10 that merge, at the external wall, into nipples 14 for the connection of pipelines. The sleeve 20 comprises a plurality of orifices 21, 22 extending through a wall of the sleeve 20 from an internal surface 25 of the sleeve 20 to an external surface 24 of the sleeve 20. The sleeve 20 is capable of being displaced relatively to the fluid collector 10 in a direction of movement 60. Furthermore, the sleeve 20 as shown in FIG. 1 a first circular cross-section so that the sleeve 20 is capable of being displaced in the internal chamber of the fluid collector 10 that has a second circular cross-section.

Figure 2:
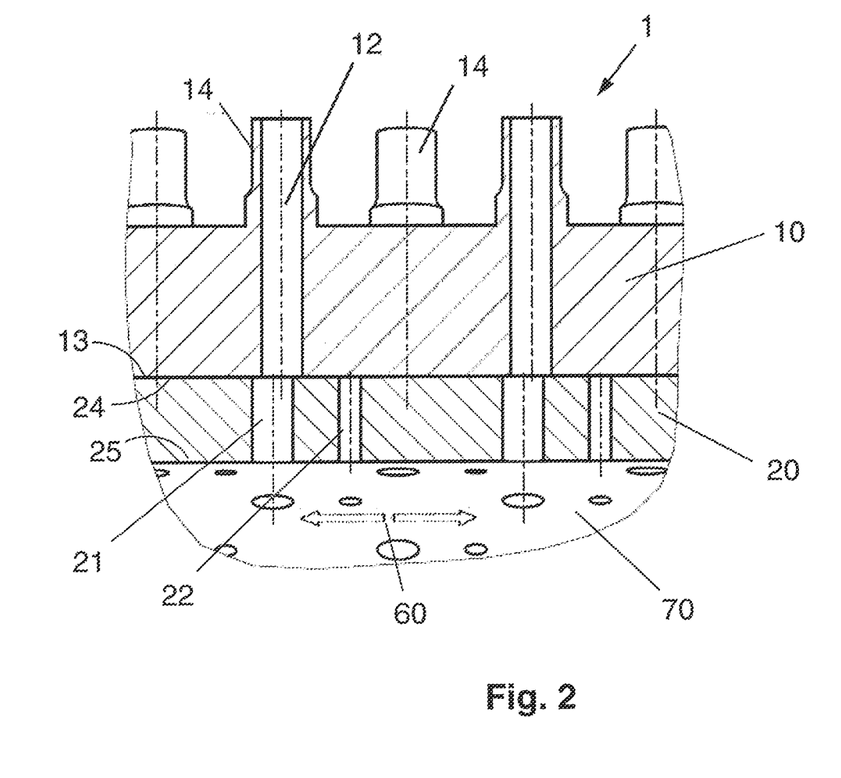
FIG. 2 is a partial longitudinal section of an exemplary embodiment of a throttle device.

FIG. 2 shows a portion of FIG. 1 that represents, in detail, a longitudinal section of the external wall of the fluid collector 10 and the wall of the sleeve 20. FIG. 2 shows a plurality of orifices 21, 22 extending from the internal surface 25 of the sleeve 20 to the external surface 24 of the sleeve 20. The outlets 12 extending from an internal surface 13 of the fluid collector 10 to the nipples 14 are likewise shown in the figure. For each outlet 12 on the fluid collector 10 there is provided at least one corresponding orifice 21, 22 in the sleeve 20, so that fluid 70, for example water in FIG. 2, flows from the interior of the sleeve 20 via one of the orifices 21, 22 into one of the outlets 12 on the fluid collector 10.

The external surface 24 of the sleeve 20 is in plane-plane contact with the internal surface 13 of the fluid collector 10 such that no fluid or virtually no fluid can flow from an orifice 21, 22 in the sleeve 20 into the region between the internal surface 13 of the fluid collector 10 and the external surface 24 of the sleeve 20 to another, adjacent orifice 21, 22. Consequently, the plane-plane contact between the external surface 24 of the sleeve 20 and the internal surface 13 of the fluid collector 10 serves as a seal between adjacent orifices 21, 22 in this region.

However, it is also possible for seals to be disposed in the internal surface 13 of the fluid collector 10 or the external surface 24 of the sleeve 20, which seals protrude from the respective wall and are in contact, across their entire surface, with the opposite wall such that they likewise seal an orifice 21, 22 in the sleeve 20, in the region between the internal surface 13 of the fluid collector 10 and the external surface 24 of the sleeve 20, from another, adjacent orifice 21, 22 in such a way that no fluid can cross over from one orifice to the other. These seals might be beads of the material of the sleeve or of the fluid collector or alternatively elastic seals made of materials such as rubber, silicone or the like.

A fluid communication route is produced that extends from the inlet 11 of the fluid collector 10 through the orifices 21, 22 in the sleeve 20 to the outlets 12 in the wall of the fluid collector 10 for the nipples 14 and the pipes connectable thereto, when the position of the sleeve 20 relative to the fluid collector 10 is such that the orifices 21, 22 in the sleeve 20 form, at least in part, a fluid communication route with the outlets 12 on the fluid collector 10.

Due to the fact that an exchange of fluid is impossible in the region between the internal surface 13 of the fluid collector 10 and the external surface 24 of the sleeve 20, there is the assurance that each pipe connectable to a nipple 14 has the same throughput volume flowing through the orifice 21, 22 and that the flow does not become stagnant in any one pipe while the total volume flows through another, adjacent pipe.

It is further possible to reduce the throughput volume by separating the orifice 21 and the outlet 12 from each other by means of a relative movement in the direction of movement 60 and by creating a fluid communication route between a smaller orifice 22 and the outlet 12. On account of the reduced cross-section of the small orifice 22, the fluid can flow at only a lower rate, for a given pressure, to the outlet 12 and into a pipe connectable thereto.

It is likewise possible to reduce the throughput volume by displacing the orifice 21 relatively to the outlet 12 by means of a movement in the direction 60 such that they still remain in fluid communication with each other. As a result of the smaller effective cross-section of the orifice 21, 22 overlapping the outlet 12, only a smaller amount of fluid can flow to the outlet 12 and into a pipe connectable thereto.

The fluid communication route can be blocked by means of a relative movement in the direction 60 such that the orifice 21, 22 is no longer aligned with the outlet 12 and the orifice 21, 22 is closed by a seal, in the case of FIG. 2 the internal surface 13 of the fluid collector 10. In this context, the direction of movement 60 in FIG. 1 and FIG. 2 represents a translatory direction of movement.

The cross-section of the fluid collector 10 and of the sleeve 20 illustrated in FIG. 1 can, in the simplest case, be axially symmetrical in the form of a tube circular cross-section. In this case, it is possible to achieve a precise fit and thus a seal between the sleeve 20 and the fluid collector 10 by lathe machining of the workpieces. In the case of an axially symmetrical cross-section, the relative movement can refer not only to translatory motion in the direction 60, but also to relative rotary motion in the form of relative movement between the sleeve 20 and the fluid collector 10. This is likewise possible only when the external surface 24 of the sleeve 20 and the internal surface 13 of the fluid collector 10 are axially symmetrical. A possible embodiment involving rotatory motion in the direction 61 is explained in more detail with reference to FIG. 3.

In the case of rotational symmetry of the sleeve 20 and the fluid collector 10, it is further conceivable to provide the sleeve 20 and the internal surface 13 of the fluid collector 10 with a diameter that varies along the longitudinal axis, that is to say, in the direction signified by arrow 60 in FIG. 1. For example, a cross-section decreasing in the direction extending away from the inlet 11 would be suitable for balancing the reduction in static pressure resulting from the fluid flowing off at the sides in the direction of flow of the fluid. Another possibility for achieving a pressure balance by means of a fluid displacement element 33 is explained in more detail with reference to FIG. 7.

If the relative movement between the sleeve 20 and the fluid collector 10 is intended to be only a translatory motion in the direction of movement 60, then the internal surface 13 of the fluid collector 10 and the external surface 24 of the sleeve 20 may basically represent any desired mating prism-shaped members capable of being nested into each other, as for example cuboid prisms.

Figure 3:
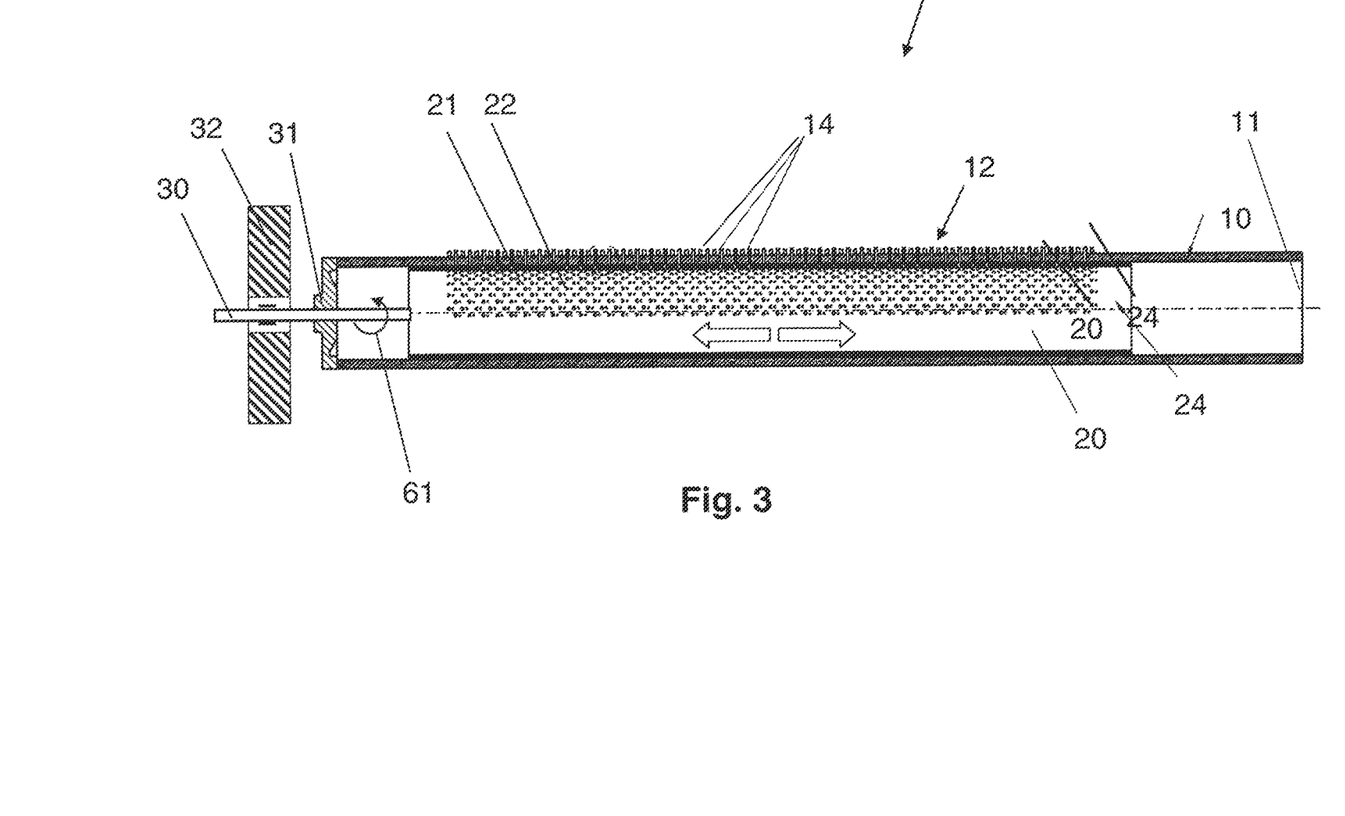
FIG. 3 is a longitudinal section of an exemplary embodiment of a throttle device.

FIG. 3 is a longitudinal section of an exemplary embodiment of a throttle device 1 of the invention in which the relative movement in the form of rotatory motion in the rotary direction 61. The throttle device comprises a shaft 30 that engages the sleeve 20 such that the sleeve 20 can be caused to rotate as a result of a rotatory movement of the shaft 30. The shaft 30 is mounted in a shaft bearing 31 at an end of the throttle device located opposite the inlet 11 of the fluid collector 10 in such a way that the shaft extends along the axis of rotational symmetry of the external surface 24 of the sleeve 20 and the internal surface 13 of the fluid collector 10. A shaft drive 32 is provided on the shaft 30 outside the fluid collector 10, which shaft drive 32 is adapted to rotate the shaft 30 and thus the sleeve 20 through an angle that can be predetermined.

It would also be conceivable to mount the shaft 30 at both ends of the throttle device 1 when a centrally located shaft bearing is likewise provided in the inlet 11. It would likewise be conceivable to place a rotary drive inside the fluid collector 10 such that it drives the sleeve 20 directly.

Figure 4:
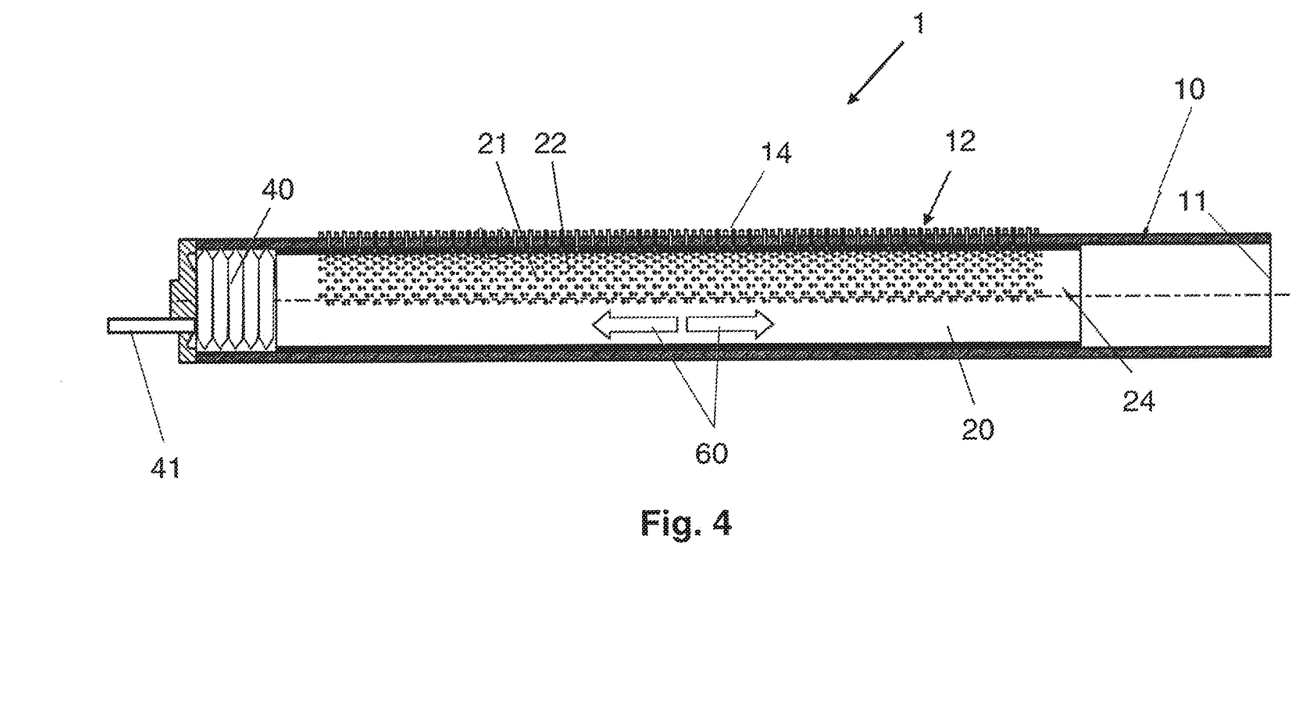
FIG. 4 is a longitudinal section of an exemplary embodiment of a throttle device.

FIG. 4 is a longitudinal section of a further exemplary embodiment of a throttle device 1 of the invention, in which the relative movement is a translatory movement in the direction 60. The device comprises a bellows 40 that engages the sleeve 20. The bellows 40 is disposed in the internal chamber of the fluid collector 10 at that end of the fluid collector 10 which is remote from the inlet 11. The bellows 40 encloses a sealed space and is capable of expanding in the direction of movement 60. The fluid collector 10 is further connected to a hydraulic pipeline 41, by means of which pressure can be applied to the bellows 40. As a result of an increase of pressure in the hydraulic line 41, the bellows 40 will expand and displace the sleeve 20 in the direction of movement 60 towards the inlet 11. When the pressure in the hydraulic line 41 decreases and the hydraulic line 41 is opened to a reservoir, the bellows 40 will be compressed by the pressure of the fluid, and the sleeve 20 will move in the opposite direction.

It would also be conceivable to provide a movable hydraulic piston instead of the bellows 40 in the fluid collector 10, which movable hydraulic piston engages the sleeve 20 and divides the volume of the internal chamber in the fluid collector 10 into a portion filled with hydraulic medium and remote from the inlet 11 and a portion which is filled with the fluid and in which the sleeve 20 is also located. In other respects, the operation of the hydraulic piston is equivalent to that of the bellows 40.

Figure 5:
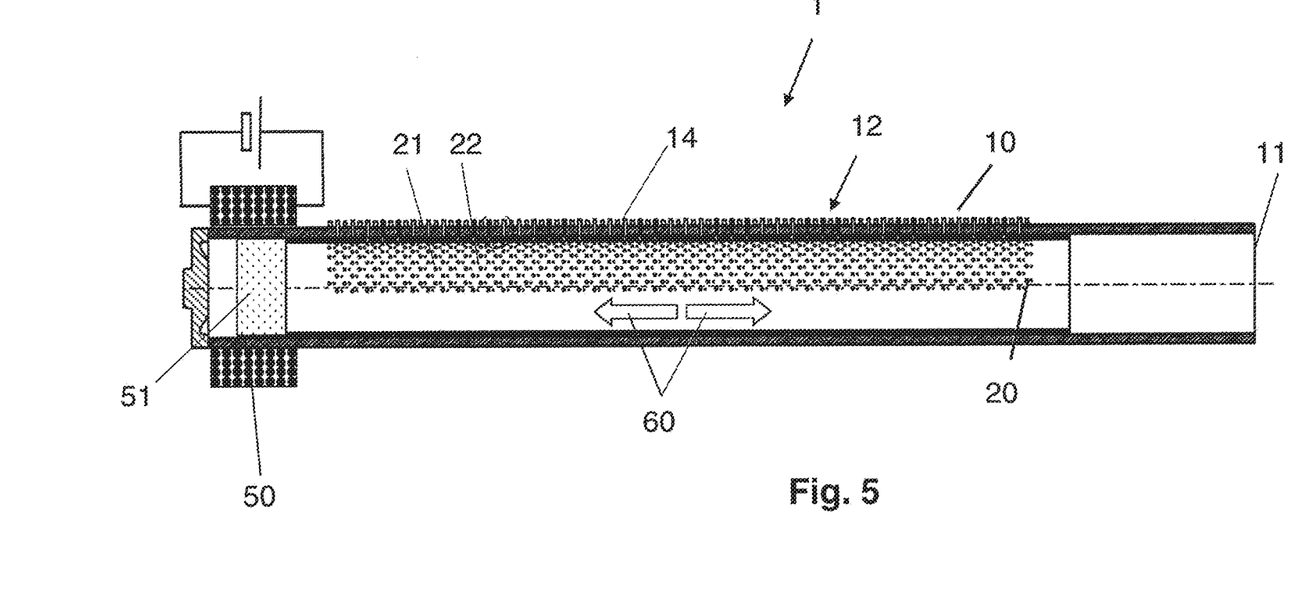
FIG. 5 is a longitudinal section of an exemplary embodiment of a throttle device.

FIG. 5 is a longitudinal section of a further exemplary embodiment of a throttle device 1 of the invention, in which the relative movement is a translatory movement in the direction of the arrow 60. The throttle device 1 comprises a solenoid actuator 50 that is disposed outside and around the fluid collector 10 at that end of the fluid collector 10 which is remote from the inlet 11. Furthermore, the sleeve 20 comprises at least one magnetic component 51, e.g. a permanent magnet serving as a longitudinally displaceable armature for the solenoid actuator 50. Thus a magnetic field produced by the solenoid actuator 50 exerts a force on the sleeve 20. In this way, the solenoid actuator 50 is able to move the sleeve 20 in the direction of movement 60 in the fluid collector 10. Advantageously, the sleeve 20 is reset by a resilient means, for example, a spring. By the application of varying electric currents to the solenoid actuator 50, the sleeve will be displaced axially in this manner and the throttle thus controlled.

One particular advantage gained when the sleeve 20 is driven by means of a solenoid actuator 50 is that no wall feedthroughs are required to the fluid collector 10 for the moving components so that long-term leak tightness is guaranteed.

Furthermore, a displacing mechanism is also possible, in which use is made of a bimetal in place of a magnet 50 or a hydraulic line 41.

FIGS. 6a, 6b, 6c, 6d, and 6e each show a cross-section of orifices or sub-orifices of various exemplary embodiments of a throttle device 1, and any one or more of the orifices or sub-orifices shown can be disposed in the sleeve 20. It is also possible for combinations of a plurality of exemplary embodiments shown in FIGS. 6a to 6e to be applied to the sleeve 20. The term "sub-orifices" is understood to mean orifices 21, 22 that form a hole pattern by means of at least two orifices of any geometry or that are of at least a cross-section that varies along the direction of movement 60. Examples of sub-orifices are shown in FIGS. 6a to 6e. To achieve variability of the throttle device, use can be made of a single orifice or a hole pattern that has an increasing and/or decreasing internal cross-section along the direction of movement 60 and that comprises one or more orifices.

Figure 6A:
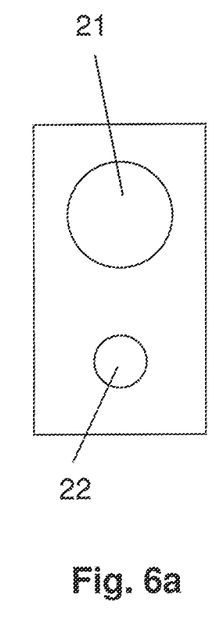
FIGS. 6a to 6e are cross-sections of sub-orifices of various exemplary embodiments of a throttle device.

FIG. 6a shows two orifices 21, 22 that are spaced apart in the direction of movement 60 such that only one of the two orifices can form a fluid communication route at any one time with the corresponding outlet 12. Therefore, such an embodiment allows two discrete throughput volumes to be set in a simple manner.

The two orifices 21, 22 as shown in FIG. 6a are part of a hole pattern and can be construed as sub-orifices. They are of circular cross-section in each case, and a first cross-section of the first orifice 21 is larger than a second cross-section of the second orifice 22. The centers of both circular cross-sections are located on a vertical axis.

Figure 6B:
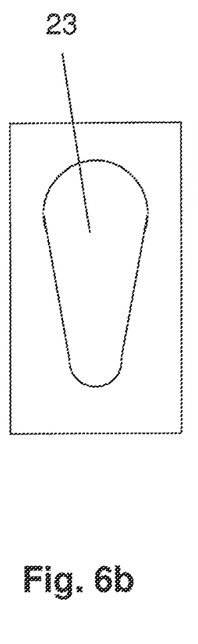

By contrast, FIG. 6b shows an orifice 23 of a continuously decreasing effective cross-section for fluid communication. Thus FIG. 6b shows a single orifice resulting from the orifices 21, 22 as shown in FIG. 6a by placing tangents on the circles such that the two circles can be joined by means of a tangent to the right of the orifice and a tangent to the left of the orifice. In this way the width of the single orifice 23 varies along the direction of movement 60 continuously and linearly from a maximum width to a minimum width.

The cross-section of the fluid communication route between the inlet 11 and a single outlets 12 is at its maximum when the outlet 12 has a diameter that is equal to the widest portion of the orifice shown in FIG. 6b, and the sleeve is positioned in relation to the fluid collector 10 in such a way that the outlet 12 is disposed above this widest portion of the orifice 23. If the position of the outlet 12 in relation to the sleeve 20 is moved such that the outlet 12 is located above a narrower portion of the orifice 23, i.e., in FIG. 6b from top to bottom, the cross-section of the fluid communication route decreases and the throughput volume is reduced.

The orifice shown in FIG. 6b has a conical geometry enclosing the two orifices shown in FIG. 6a by removing the intermediate piece of varying size situated between the two circular orifices. Thus the orifice shown in FIG. 6b is a sub-orifice according to the given definition.

Figure 6C:
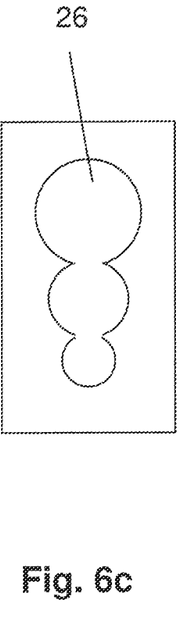

Similar to FIG. 6b, FIG. 6c shows an orifice 26 that makes it possible to vary the effective cross-section of the fluid communication route and thus the throughput volume in three steps, in accordance with the three sub-orifices shown. The sub-orifices are lined up along the direction of movement 60 and they overlap each other. The sub-orifices are three circular orifices touching each other, of which the first circular orifice is located at the top end of the array of orifices and the smallest circular orifice is located at the bottom end of the array of orifices. Since the three circular orifices touch each other, a single orifice 26 is formed. Since the sub-orifices shown in FIG. 6c are joined together, a change in flow is possible without any interruption, unlike the exemplary embodiment shown in FIG. 6a. Furthermore, the sub-orifices as shown in FIG. 6c might be arranged so as not to touch each other, in which case they would thus form a hole pattern formed by three individual orifices.

Figure 6D:
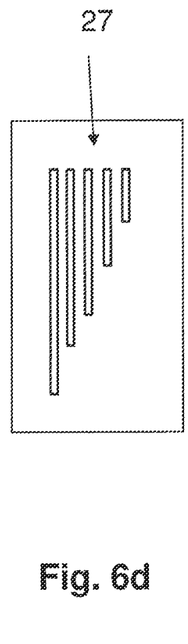

FIG. 6d shows another embodiment comprising sub-orifices forming a hole pattern 27, and the sub-orifices make it possible for the effective cross-section of the fluid communication route and thus the throughput volume to be varied in five steps, in accordance with the five sub-orifices shown.

The hole pattern 27 as shown in FIG. 6d comprises five rectangular sub-orifices of reducing axial length as regarded from the left to the right. Staggering of the ends occurs downwardly in the vertical direction and decreases uniformly in the vertical direction from the left to the right, while the ends of the sub-orifices in the vertical direction all terminate upwardly on an imaginary line extending in the horizontal direction.

Thus the sub-orifices as shown in FIG. 6d are parallel, slot-shaped sub-orifices oriented in the direction of movement 60. The width of the sub-orifices is configured such that all of them can be at the same time disposed below a corresponding outlet 12. However, the slots are of varying length in the direction of movement 60 so that at a top end all of the slots contribute to the cross-section of the fluid communication route. Each of the slots terminates at uniform intervals in the direction of movement so that when the sleeve 20 is displaced relatively to the fluid collector 10, the number of slots contributing to a fluid communication route with the outlet 12 decreases by one stripe at a time until the communication route is blocked. In this way, it is particularly easy to provide a characteristic curve in which the throughput volume is an almost linear function of the position of the sleeve 20.

Figure 6E:
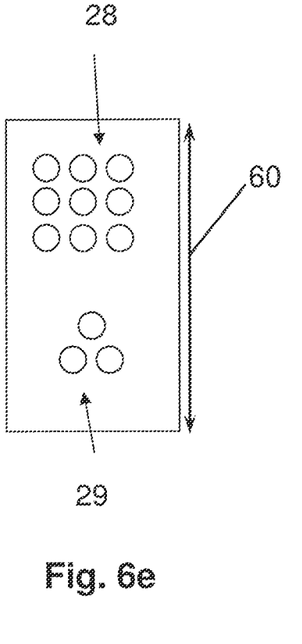

FIG. 6e shows another embodiment of the sub-orifices that allows two discrete throughput volumes to be set. The sub-orifices are disposed in two groups, of which the first group is in the form of a first hole pattern 28 and the second group is in the form of a second hole pattern 29. As in the case of FIG. 6a, these two groups are spaced so far apart in the direction of movement 60 that only one of the two groups can form a fluid communication route with the corresponding outlet 12 at any one time. Each of the groups has a different number of sub-orifices and the sub-orifices are of the same cross-section. Therefore, it is possible without any change of tools and geometrical analyses to predetermine a fixed integral ratio between the cross-sections of the fluid communication routes for the two positions of sub-orifices.

The first hole pattern 28 as shown in FIG. 6e comprises nine circular orifices that are arranged as a square, each having the same diameter. Furthermore, the second hole pattern 29 comprises three circular orifices of the same cross-section as that of the orifices in the first hole pattern 28. The three orifices of the second hole pattern 29 are arranged as a triangle, two of which are disposed on a common horizontal line, the third being located vertically above the mid-point between them. Furthermore, the two hole patterns 28, 29 are disposed in relation to each other in such a way that the orifice at the upwardly oriented apex of the triangular hole pattern 29 is in alignment with the central vertical row of the first hole pattern 28.

On the whole, it is possible to configure the orifices shown by way of example in FIGS. 6a to 6e not only as a single orifice having a closed area but also as a group of sub-orifices. In doing so, it is possible to assign various geometries to orifices in a group, as shown in FIGS. 6a, 6d, and 6e, for example. It is also possible to provide individual orifices that take on a new shape when they are joined together, as shown, for example, in FIGS. 6b and 6c. Thus it is possible to combine, for example, circular, rectangular, square-shaped, or ellipsoidal orifices together to form a hole pattern, as shown in FIGS. 6a, 6d, 6e by way of example, or to produce a single orifice based on these geometrical shapes taken alone or in combination, as shown in FIGS. 6b and 6c, for example.

In principle, it is alternatively possible to distribute the outlets 12 over a plurality of sub-orifices. However, it is more difficult, at least as regards the production of the outlets, to incorporate the same again in a nipple 14 for connection to a pipe, while in the case of the sleeve 20, it is only necessary to produce the sub-orifices through the sleeve so as to provide the fluid communication route to the common inlet.

It is possible to configure the sub-orifices in terms of their size, shape, and arrangement in such a way that only one sub-orifice provides a fluid communication route at any one time between the inlet 11 and a single outlet 12 or alternatively that a plurality of sub-orifices provide a fluid communication route at one and the same time. Furthermore, it is possible, by means of the arrangement and shape of the sub-orifices, to provide a predetermined characteristic curve for the throughput volume as a function of the relative movement between the sleeve 20 and the fluid collector 10.

Figure 7:
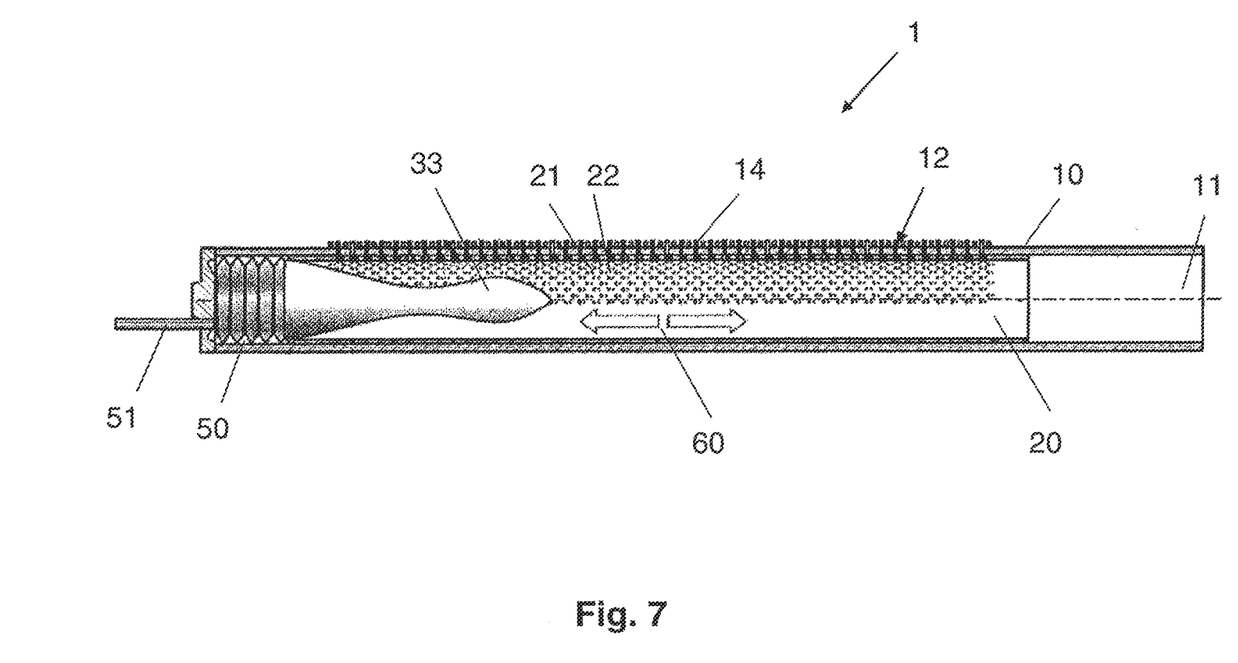
FIG. 7 is a longitudinal section of an exemplary embodiment of a throttle device.

FIG. 7 is a longitudinal section of an exemplary embodiment of a throttle device 1 of the invention that is substantially equivalent to the embodiment as shown in FIG. 4. Additionally, the throttle device 1 comprises a fluid displacement element 33 protruding into the interior of the sleeve 20. The fluid flowing into the fluid collector 10 through the inlet 11 flows substantially from the inlet 11 in the direction of movement 60 into the fluid collector 10, and fluid leaves the interior of the device laterally through the orifices 20, 21 in the sleeve 20 and the outlets 12. Therefore, the static pressure of the fluid decreases as the distance from the inlet increases, and the throughput volume of the fluid flowing away through the nipples 14 into the individual connectable pipes likewise decreases for a given, constant cross-section of the orifices 21, 22. In order to balance out this drop in pressure, it is possible, on the one hand, to reduce the diameter of the fluid collector 10 and the sleeve 20 in the direction of movement 60. This is possible when the sleeve 20 is configured to perform only rotatory motion. If a translatory direction of movement 60 is intended for the sleeve 20, it is possible instead to provide a fluid displacement element 33. The fluid displacement element 33 is shaped such that it reduces the cross-sectional area in the interior of the sleeve 20 at an increasing distance from the inlet 11 in such a way that the drop in pressure resulting from the effluence of the fluid is balanced out. Thus a uniform pressure can be achieved for all orifices in the sleeve 20 so that a uniform throughput volume flows through all orifices 21, 22 having a uniform cross-section and the outlets 12 that are in fluid communication with said orifices 21, 22. The same volume of fluid flows through all of the pipes connectable to the nipples 14.

The invention claimed is:

1. A throttle device for a fluid collector of a steam generator for varying the pressure of a fluid in a plurality of parallel outlets, the throttle device comprising: a fluid collector having an inlet and a plurality of outlets for the fluid, a control element that is at least partially displaceably mounted in the internal chamber of said fluid collector and comprises a plurality of orifices wherein said orifices and said outlets on said fluid collector are configured and positioned in said control element such that the cross-section of a plurality of fluid communication routes between said internal chamber of said fluid collector and a plurality of outlets on said fluid collector can be varied by means of a relative movement of said control element in relation to said fluid collector, wherein said control element is a sleeve and said orifices are disposed in said sleeve such that the orifices correspond to said outlets of said fluid collector, and wherein between said sleeve and said fluid collector seals are provided such that in a region between of an outside surface of said sleeve and an inside surface surrounding said internal chamber of said fluid collector no fluid communication takes place between said orifices in said sleeve, wherein said seals project from said outside surface of said sleeve or said surface surrounding said internal chamber of said fluid collector and are in each case in plane contact with the corresponding opposing surface of said fluid collector or of said sleeve.

2. The throttle device as defined in claim 1, wherein the cross-sections of said outside surface of said sleeve and said inside surface of said fluid collector are axially symmetrical.

3. The throttle device as defined in claim 1, wherein said relative movement is a rotatory movement.

4. The throttle device as defined in claim 3, wherein said throttle device comprises a shaft and said sleeve engages said shaft such that rotation of said shaft causes said sleeve to execute rotatory motion.

5. The throttle device as defined in claim 1, wherein said relative movement is a translatory movement.

6. The throttle device as defined in claim 5, wherein said sleeve is displaceable relatively to said fluid collector along an axis of translatory motion for execution of the translatory movement.

7. The throttle device as defined in claim 5, wherein said throttle device comprises a bellows, which engages said sleeve such that the exertion of pressure on said bellows can cause said sleeve to execute translatory motion.

8. The throttle device as defined in claim 5, wherein said control element is in the form of a piston, by means of which a pressure difference can be produced between said internal chamber of said control element and a sub-region of said fluid collector.

9. The throttle device as defined in claim 5, wherein said throttle device comprises a magnet disposed outside said fluid collector, wherein said sleeve comprises a magnetic material and said magnet is configured and positioned such that when said magnet executes translatory motion said sleeve can be caused to execute translatory motion as a result of magnetic forces.

10. The throttle device as defined in claim 1, wherein said relative movement is a combination of translatory motion and rotatory motion.

11. The throttle device as defined in claim 10, wherein said throttle device comprises a spindle as said shaft, which spindle has a male screw thread that cooperates with a female screw thread on said control element.

12. The throttle device as defined in claim 1, wherein said seals are formed by a surface of said internal chamber of said fluid collector in plane contact with said outside surface of said sleeve.

13. The throttle device as defined in claim 1, wherein said orifices extend in the direction of motion along said sleeve and have a width, as measured at right angles to the direction of motion, which varies along the longitudinal direction of said sleeve such that a cross-section of a fluid communication route through said orifice and said corresponding outlet can be varied by a relative movement of said sleeve in relation to said fluid collector.

14. The throttle device as defined in claim 1, wherein said orifices in said sleeve or said outlets on said fluid collector are in the form of a plurality of sub-orifices.

15. The throttle device as defined in claim 14, wherein said sub orifices are disposed such that the relative movement between said sleeve and said fluid collector can cause the number of said sub-orifices through which a fluid communication route is formed between the interior of said sleeve and said outlets on said fluid collector to be varied.

16. The throttle device as defined in claim 1, wherein said throttle device comprises a fluid displacing element disposed in the interior of said sleeve, which fluid displacing element is shaped such that a static pressure at the orifices is the same along said sleeve for at least one throughput.

17. The throttle device as defined in claim 1, wherein the seals are beads of the material of the sleeve or of the fluid collector.

18. The throttle device as defined in claim 1, wherein the plurality of outlets of the fluid collector merge at an external wall of the fluid collector into nipples for the connection of pipelines.

* * * * *